United States Patent [19]

Johansson et al.

[11] Patent Number: 4,617,426
[45] Date of Patent: Oct. 14, 1986

[54] METHOD FOR CURRENT SUPPLY TO A SUBSCRIBER TELEPHONE FROM A TELEPHONE EXCHANGE

[75] Inventors: Jan H. Johansson, Bålsta; Nils J. Sundvall, Lidingö, both of Sweden

[73] Assignee: Telefonaktiebolaget LM Ericsson, Stockholm, Sweden

[21] Appl. No.: 598,322

[22] PCT Filed: Jun. 14, 1983

[86] PCT No.: PCT/SE83/00242
§ 371 Date: Mar. 6, 1984
§ 102(e) Date: Mar. 6, 1984

[87] PCT Pub. No.: WO84/00459
PCT Pub. Date: Feb. 2, 1984

[30] Foreign Application Priority Data

Jul. 6, 1982 [SE] Sweden .......................... 8204185

[51] Int. Cl.$^4$ ............................................. H04M 19/00
[52] U.S. Cl. .................................. 179/16 AA; 179/77
[58] Field of Search ............... 179/70, 77, 16 F, 16 A, 179/18 FA, 17 OJ, 2 BC, 78 R

[56] References Cited

U.S. PATENT DOCUMENTS

| | | | |
|---|---|---|---|
| 4,315,106 | 2/1982 | Chea, Jr. | 179/16 F |
| 4,385,336 | 5/1983 | Takeshita et al. | 361/42 |
| 4,419,542 | 12/1983 | Embree et al. | 179/77 |

FOREIGN PATENT DOCUMENTS

| | | | |
|---|---|---|---|
| 0037966 | 3/1982 | Japan | 179/16 F |
| 2065418 | 6/1981 | United Kingdom | 179/77 |
| 2093314 | 8/1982 | United Kingdom | 179/77 |

Primary Examiner—Gene Z. Rubinson
Assistant Examiner—R. Vaas
Attorney, Agent, or Firm—Roberts, Spiecens & Cohen

[57] ABSTRACT

A method in current feed to a subscriber telephone from a telephone exchange in which there is arranged a voltage source (11). A differential amplifier (1) senses the potential difference between the terminals of the voltage source (11), and after low pass filtering (2) a reference voltage (UREF) is added (3). The thus-obtained sum voltage is allowed to constitute the reference value in the system. The arithmetical mean value of the terminal potentials of the voltage source is utilized as a corresponding actual value. The difference between these reference and actual values is allowed to control a current tap in equal phase from both terminals of the voltage source.

2 Claims, 1 Drawing Figure

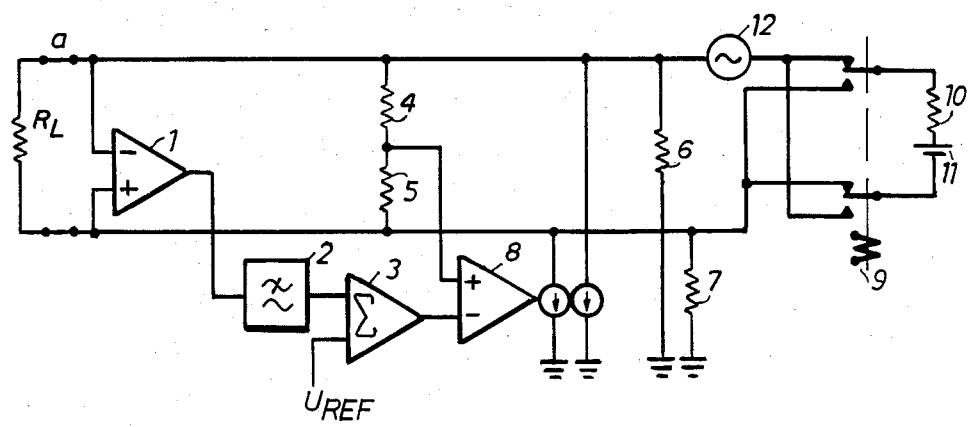

METHOD FOR CURRENT SUPPLY TO A SUBSCRIBER TELEPHONE FROM A TELEPHONE EXCHANGE

TECHNICAL FIELD

The present invention relates to a method for supplying current to subscriber telephones from a telephone exchange.

BACKGROUND ART

In telephone installations subscriber telephones are connected to an exchange via so-called subscriber lines which are connected in the exchange to an adaption circuit, a so-called subscriber line interface circuit (SLIC). DC supply, inter alia, to the associated subscriber telephones is carried out by such a circuit.

A constant direct voltage is utilized for this power supply, according to the prior art. The current flowing through the subscriber line will thus be a function of the internal resistance of the subscriber telephone or terminal, but naturally also of the line length. The internal resistance in apparatus can be kept within narrow limits but the line length and line resistance can naturally vary considerably. If there is a constant direct voltage, this must be put at such a value that sufficient direct current can also be fed out to long lines. Thus a greater current than necessary flows through the shorter lines and larger losses than necessary have to be reckoned with in the line, as well as in tha adaption circuit, and above all in the feed resistance in this circuit.

Heat due to the losses puts a limit on the packing density of the circuits in the exchange, and it is accordingly a primary object to reduce heat generation.

It is also known to utilize a voltage source with a plurality of outputs for different voltages, the selection of voltage thus being enabled with regard to, inter alia, line length such that heat due to losses is reduced.

As a further development of such a system, a solution could be considered which utilizes a continuously variable voltage source with low self power consumption, which is controlled by the conditions on the line such that the subscriber apparatus is satisfactorily supplied with current, while the loss due to heat is minimized. A known realization according to this principle utilizes a symmetric arrangement of two so-called choppers, each feeding one of the subscriber line wires.

From the aspect of saving in components, an arrangement with only one chopper would be preferable, in spite of the unsymmetry which would be thus introduced. The Swedish Patent Application SE 78.02565-7 illustrates such an unsymmetric arrangement, in which the current feed resistance is eliminated with the exception of a small protective resistance. The magnitude of the power gain achieved is considerable, and is dependent on the relationship between the values of the simulated resistance of the apparatus and the protective resistance.

DISCLOSURE OF INVENTION

The technical problem solved by the present invention is associated with maintaining, in an unsymmetric DC current feed of the kind described above, the potential of one of the two terminals of the subscriber line circuit at a constant mean value, simultaneously as the potential of the other terminal is given a mean value which is dependent on the load, in this case functionally dependent on the mean current taken out between the terminals. After possible polarity reversal of the current feed, the condition for one pole must apply to the other and vice versa.

BRIEF DESCRIPTION OF DRAWING

The invention will be described in the following in more detail with reference to the accompanying drawing whose sole FIGURE illustrates an embodiment of the invention.

BEST MODE FOR CARRYING OUT THE INVENTION

An embodiment of an apparatus in accordance with the invention is illustrated in the FIGURE. The subscriber telephone fed with current is symbolized by a resistor $R_L$. The telephone is connected to the associated line circuit via a subscriber line having an a wire and a b wire. The DC feed is illustrated by a voltage source 11 and a resistor 10 symbolizing the internal resistance. A pole reversal device is illustrated as being realised with the aid of a relay 9, which is controlled by unillustrated control circuits in the exchange. Reversal can naturally be provided in other ways as well. In a telephony application there are speech signals superimposed on the direct voltage in both directions on the subscriber line. The corresponding alternating voltage can be assumed generated in the AC generator 12 in this connection.

The voltage between terminal a and terminal b on the output of the line circuit towards the line is sensed with the aid of a differential amplifier 1. Transversal signal components, e.g., from speech signals on the line, are filtered off from the output voltage from the amplifier 1 with the aid of a lowpass filter 2. A reference voltage $U_{REF}$ is then added to the filtered voltage in an adding circuit 3. The output signal from the adding circuit is made to constitute the reference value in the regulating system which constitutes the invention.

A corresponding actual value is formed with the aid of a resistive voltage divider comprising two resistors 4, 5 connected between the terminals a and b.

A longitudinal amplifier 8 with two current outputs is connected such that it can tap off current in equal phase from the a wire and the b wire against a constant potential, e.g., ground potential. The resistors 6 and 7 accordingly represent the internal resistance of the two current generators.

A steady state in the circuit may be as follows. The terminal a has the voltage $-5$ V and the terminal b has the voltage $-30$ V. The gain in the differential amplifier 1 is put at $+0.5$, the output voltage from this amplifier will then be $-12.5$ V. The reference voltage $U_{REF}$ is put at $-5$ V, the output voltage from the adding circuit 3 assuming the value of $-17.5$ V, said voltage thus constituting the system reference value. This voltage is connected to the negative input of the longitudinal amplifier 8. The resistors 4 and 5 are equal, and the system actual value will then be $-17.5$ V. The centre point of the voltage divider is connected to the positive input of the longitudinal amplifier 8. In the conditions given above there is thus no control signal to the current generators.

Assume now that a similar subscriber telephone, alternatively an apparatus of the same kind but having a different line length, is connected to this line circuit. The load on the line circuit will then change. Assume, further, that the new load resistance becomes higher. In order to feed out sufficient current to the line the transversal voltage from the voltage source 11 must be increased. This voltage source is controlled in a manner not illustrated in the FIGURE.

Assume that the new transversal voltage is 30 V. The system then finds that the new steady state is defined by the voltage −5 V on terminal a and the voltage −35 V on terminal b. With the gain of +0.5 in the differential amplifier 1 there is obtained an output voltage from it of −15 V. The reference value to the amplifier 8 will thus be −20 V. Since the actual value from the voltage divider 4,5 will also be −20 V, no control signal to the current generators is obtained.

We note thus that the condition $$U_M = (U_D/2) + U_{REF} \text{ where}$$

$U_M$ is the arithmetical mean of the transversal voltage, $U_D$ is the differential voltage between the terminals a and b, $U_{REF}$ is the reference voltage fed to the adding circuit is met every time. In other words, the transversal voltage average value is all the time equal to half the difference voltage plus a constant reference voltage, irrespective of the load on the line circuit. This means that the terminal a on the line circuit is kept at a potential equal to the reference potential fed to the adding circuit.

In signalling between a public telephone exchange and a subscriber exchange, a so-called PABX (private automatic exchange) or a coin apparatus, it may be required to carry this out with the aid of pole reversal of the current feed.

After pole reversal, with retained reference voltage and reversed sign on the amplification of the amplifier 1, a steady state is satisfied in the circuit, ie without control voltage to the current generators, of the voltages −30 V on the terminal a and −5 V on terminal b. The same reasoning as applied above naturally also applies to change in the load on the line circuit.

The inventive concept also includes variations of the above-described embodiment, e.g., with other values for the gain on the amplifier 1 and other division conditions in the resistive voltage divider 4, 5.

What is claimed is:

1. In a telephone system wherein current is fed from a voltage source in a telephone exchange to first and second terminals of a subscriber line circuit with a load, the method of maintaining the potential of the first terminal at a constant mean value simultaneously as the potential of the second terminal is given a mean value which is dependent on the load comprising the steps of sensing the potential differences across the terminals, low-pass filtering the sensed potential difference to obtain a low-pass filter voltage, adding a reference voltage to said filtered voltage to obtain a reference value, said reference voltage being a measure of the constant mean value of said first terminal, generating another voltage related to the potentials of both terminals to form an actual value, generating a control voltage related to said reference and actual values, and current tapping in the same phase from both of said terminals in accordance with the amplitude of said control voltage.

2. In a telephone system wherein current is fed from a voltage source in a telephone exchange to first and second terminals of a subscriber line circuit with a resistive load, apparatus for maintaining the potential of the first terminal at a constant mean value simultaneously as the potential of the second terminal is given a mean value which is dependent on the load comprising a difference amplifier means for measuring the voltage difference across said terminals and transmitting a signal representing the voltage difference, low-pass filtering means for filtering the signal from said difference amplifier means to provide a low-pass filtered signal, a reference voltage source having a potential which is at said constant mean value; a summing amplifier means having a first input for receiving the reference voltage and a second input for receiving the low-pass filtered signal from said low-pass filtering means for providing a sum voltage, potential divider means connected across said terminals for providing a voltage signal equal to one-half the potential difference across said terminals, a further difference amplifier means having a first input for receiving the signal from said potential divider means and a second input connected to said summing amplifier means for generating a current control voltage, operating current source means for feeding current to the subscriber line circuit via said terminals and current tapping means responsive to the current control voltage for tapping current from said operating current source means in the same phase for both of said terminals.

* * * * *